United States Patent [19]

Gravisse

[11] Patent Number: 5,078,462

[45] Date of Patent: Jan. 7, 1992

[54] PROCESS AND SCREEN FOR DISTURBING THE TRANSMISSION OF ELECTROMAGNETIC RADIATION PARTICULARLY INFRA-RED RADIATION

[76] Inventor: Philippe E. Gravisse, 18-20, rue de Presles, F-75015 Paris, France

[21] Appl. No.: 565,893

[22] Filed: Aug. 9, 1990

Related U.S. Application Data

[63] Continuation of Ser. No. 229,859, filed as PCT/FR86/00401, Nov. 25, 1986, published as WO88/04025, abandoned.

[51] Int. Cl.⁵ .............................................. G02B 5/22
[52] U.S. Cl. .................................... 359/359; 359/350; 359/326; 359/885
[58] Field of Search ...................... 350/1.1, 1.6, 311; 250/483.1, 472.1

[56] References Cited

U.S. PATENT DOCUMENTS

| | | | |
|---|---|---|---|
| 3,958,970 | 5/1976 | Auzel | 250/338 |
| 3,992,628 | 11/1976 | Karney | 250/338 |
| 4,195,226 | 3/1980 | Robbins et al. | 250/483.1 |
| 4,484,195 | 11/1984 | Shaffer | 350/1.5 |

FOREIGN PATENT DOCUMENTS

| | | |
|---|---|---|
| 3043381 | 6/1982 | Fed. Rep. of Germany . |
| 3135586 | 3/1983 | Fed. Rep. of Germany . |
| 2344143 | 10/1977 | France . |
| 2398281 | 2/1979 | France . |
| 2511840 | 3/1983 | France . |

*Primary Examiner*—Bruce Y. Arnold
*Assistant Examiner*—David R. Parsons
*Attorney, Agent, or Firm*—Barnes & Thornburg

[57] ABSTRACT

Process for disturbing the transmission of electromagnetic radiation emitted by a source within a predetermined wavelength band, for reception by a receiver designed to detect signals situated in said band, characterized by a screen (3) placed between said source (1) and said receiver (4), which absorbs at least part of the radiation emitted on said wavelength band and re-emits it on wavelengths outside said band. Furthermore, a screen for implementing this process.

13 Claims, 3 Drawing Sheets

PROCESS AND SCREEN FOR DISTURBING THE TRANSMISSION OF ELECTROMAGNETIC RADIATION PARTICULARLY INFRA-RED RADIATION

This is a continuation of application Ser. No. 07/229,859, filed as PCT/FR86/00401, Nov. 25, 1986, published as WO88/04025, Jun. 2, 1988, now abandoned.

BACKGROUND OF THE INVENTION

This invention is related to a process and a device producing a disturbance in the transmission of the electromagnetic radiation generated by a source within a predetermined wavelength band and designed for interception by a receiver intended to detect signals located within said band.

It more specifically relates to systems where the generator is a body of any kind emitting heat and hence infrared radiation and the detector is a camera or a telescope working in at least one predetermined band of the infrared spectrum.

Nowadays infrared cameras are utilized in a wide range of civil and military applications in order to detect, to locate and to pursue fixed or moving objects via an analysis of their infrared emitting spectrum. In this way, the infrared radiation of a vehicle engine or of an aircraft or missile mover is detected readily. This technique is the only now available operational means to detect and to pursue missiles and to guide localizing missiles at long distances up to 10,000 km. For detection purposes, several infrared bands supply specific information commonly linked to the temperature differences in the bodies under consideration and it is commonly admitted nowadays that it is becoming difficult to pursue any surface activity that could not be detected by the analysis of the infrared radiation, said analysis being eventually made in real time by an infrared telescope on board a satellite in geostationary orbit provided with a discriminator and a high speed computer.

The disadvantage of the infrared radiation lies in a substantial atmospheric absorption but there is a propagation window in earth atmosphere with a wavelength comprised between 3 and 5 micrometers. For this reason and other important technological reasons, the best multi-spectra infrared cameras work in the wavelength band comprised between 2.2 and 8 micrometers.

Nowadays the only countermeasures available toward the detection, localizing and pursue by means of an analysis of the spectrum of any infrared radiation are the use of baits, the artificial increase of atmosphere density and the remote disturbance of infrared pick up electronic circuits. Baits are easily identified by improved discriminators, while the other two countermeasures are difficult to be implemented and are not operational at present.

SUMMARY OF THE INVENTION

The object of the present invention is to design a process and a device making it possible to substantially disturb the transmission of an infrared radiation generated by a generator in wavebands preferably comprised between 2 and 12 micrometers and intercepted by a detector working in this waveband. It is aimed at disturbing existing devices for detection, localization and pursuit of an infrared radiation generated by the object, by spectrum analysis. But the invention also aims at the disturbance of the electromagnetic radiations of other wavelengths and more particularly laser radiations.

Generally speaking, the process of the invention consists, between said source and said receiver, in inserting a shield absorbing at least a portion of the radiation emitted in said wavelength band.

Besides and according to the invention it is possible to use a screen that re-radiates at least a portion of the radiation generated in said wavelength band.

According to a preferred form of embodiment of the process of the invention, a screen is utilized that absorbs at least a portion of the radiation emitted in said wavelength band before re-radiating it at wavelengths outside said band.

To disturb an infrared radiation, the process of the invention utilizes a screen that absorbs the infrared radiation in the wavelength comprised between 2 and 12 micrometers.

According to an alternative the process of the invention consists in utilizing a screen that absorbs the infrared radiation in a wavelength band less than 2 micrometers and re-radiates it in a wavelength band comprised between 2 and 12 micrometers.

The invention also relates to a screen for the implementation of the process of the invention.

The screen of the invention consists of an organic matrix comprising a series of luminescent and/or fluorescent doping materials and said doping materials preferably form at least one light cascade.

Such doped matrixes are known already in visible light spectrum applications, more particularly for improving the efficiency of photo-voltaic devices and for promoting the development of plants (French patent No. 073 21890 and French patent application No. 81 16678 by the inventor).

It has now been found that these matrixes can be utilized in other wavelengths and more particularly in the infrared spectrum in order to absorb and reflect an infrared radiation and to modify it by changing the wavelength. This invention is based on this quite unexpected discovery.

To disturb the transmission of an infrared radiation through a screen according to the invention, the absorption band of the light cascade is comprised in wavelengths ranging from 2 to 12 micrometers and the emitting band is in wavelengths above 12 micrometers.

According to an alternative embodiment, the absorption band of the light cascade is located in wavelengths under 2 micrometers while its emission band is located in wavelengths ranging from 2 to 12 micrometers.

Wavelengths of 2 to 12 micrometers correspond to the wavelengths of present infrared cameras and telescopes and more specifically they cover the propagation window in the earth atmosphere. Thus the screen of the invention makes it possible to thoroughly disturb the operation of such cameras and telescopes and makes them nearly blind.

According to the invention, said doping substances are cyclic aromatic substances including approximately from 5 to 15 nuclei and they contain at least one of the following substances: hydroxyl materials with keton groups, amino groups with double carbonated linking, amino groups associated with quaternary aminos, amino groups associated with quaternary and ketone groups, amino groups and associated with a ketone group.

Doping substances are preferably added to said matrix by chemical grafting. But they can also exist in the form of homogeneous dispersion.

According to this invention said organic matrix comprises at least one of the following materials: vinyl copolymers, polyethylene, polyethylene copolymers-PMMA, polyethylene-polystyrene copolymers and PMMA-EVA-polystyrene copolymers.

According to a particularly interesting embodiment, the screen of the invention comprises an absorption layer, a reflection layer and an absorption-emission layer. Such a screen can be obtained by a coextrusion process.

The screen of the invention can be in form of a flexible or semi-hard foil or in the form of a hard plate.

According to a particular form of embodiment of the invention, the screen also includes doping substances forming light cascades whose absorption band covers at least one portion of the sun radiation spectrum while their emission band solely covers the wavelength bands promoting plant photosynthesis. Such a screen can be a roofing element for agricultural greenhouses (French patent application No 81 16 678). In the event of a war, agricultural greenhouses can be used to shelter military vehicles in order to shield them against detection by infrared cameras.

BRIEF DESCRIPTION OF THE DRAWINGS

Other realizations and advantages of the invention will be apparent from the following detailed description with reference to the accompanying drawings of several forms of embodiment of the process and of the filter element according to the invention, which are given for the purpose of illustration alone and in which.

DETAILED DESCRIPTION OF THE INVENTION

Figure 1:
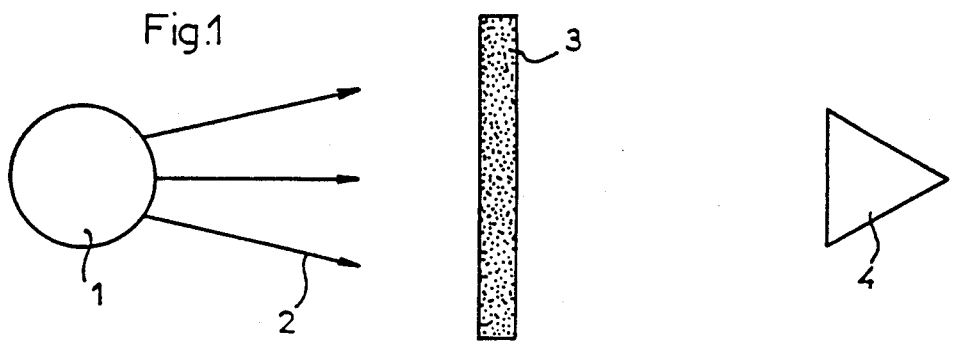
FIG. 1 is a diagrammatic view showing a first embodiment of the process and of the filter element according to the invention
Figure 2:
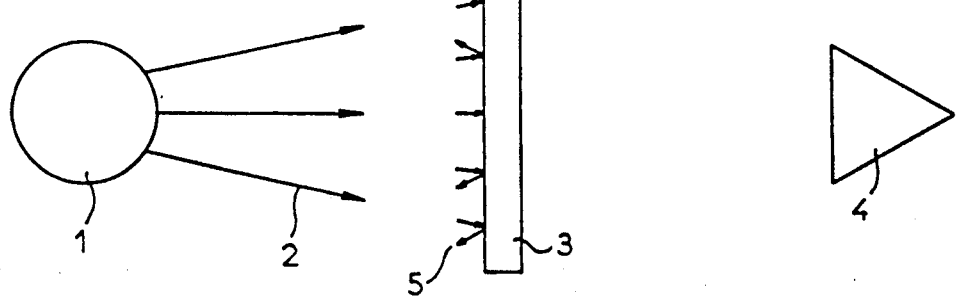
FIG. 2 is a diagrammatic view according to FIG. 1 showing another embodiment of the process and filter element according to this invention
Figure 3:
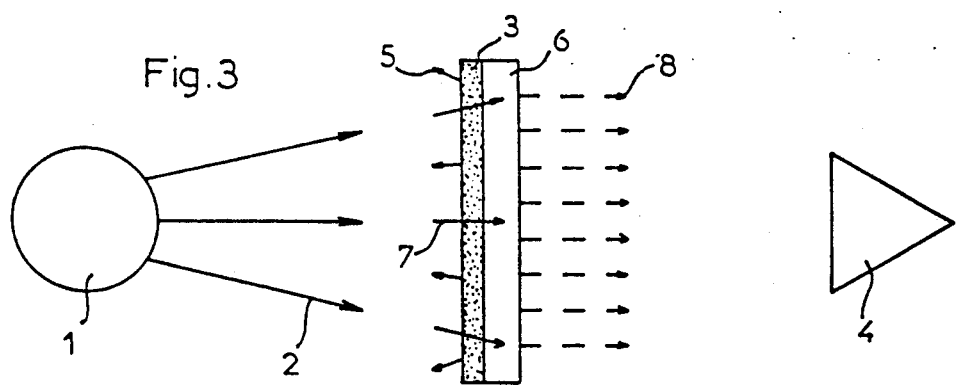
FIG. 3 is a diagrammatic view according to FIG. 1 showing a first preferred embodiment of the process and filter element according to this invention.

In FIGS. 1 to 3, a radiation source 1 is shown, producing a radiation 2, also a detector 4, designed to detect and to locate the source 1 through the spectrum analysis of the radiation 2. The source 1 can be a body radiating heat, such as the engine of a vehicle, which produces the emission of an infrared radiation whose wavelength varies with the temperature of the source. In this case, the detector 4 consists of an infrared camera or telescope operating in a wavelength band containing the radiation 2 wavelength.

For the reasons set forth in the foregoing, the wavelength band practically utilized for infrared detection is limited to preferential bands ranging from 2 to 12 micrometers.

With the object to disturb the transmission of the radiation 2 between the source 1 and the detector 4, a screen 3 is inserted between the above two elements, according to the invention. In a first version, the screen 3 absorbs radiation 2 (FIG. 1). in the of embodiment shown in FIG. 2, the screen 3 reflects the radiation 2 and according to the embodiment illustrated in FIG. 3, the screen 3 comprises a first layer 5 to reflect the radiation 2 and a second layer 6 to absorb the radiation 2, in order to re-emit it within another wavelength band located outside the operation spectrum of the detector 4. Of course the three effects: absorption, reflection and absorption/re-radiation can be associated in one screen 3.

This disturbance process was made possible by the applicant's discovery that the effects of light cascades, utilized until now solely in visible light spectrum and more particularly in the solar radiation spectrum, could ensure the three said functions in other wavelength bands and more particularly in the infrared radiation spectrum.

The screen 3 is made of an organic matrix containing doping substances forming light cascades which absorb radiations 2 for re-radiation within a band located outside the operating band of the receiver 4. A suitable selection of light cascades also makes it possible to achieve absorption and reflection effects according to FIGS. 1 and 2.

Figure 4:
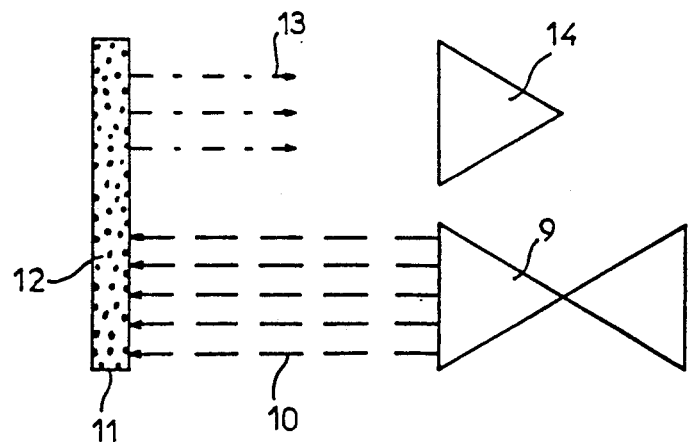
FIG. 4 is a diagrammatic view according to FIG. 1 showing a second preferred realization of the process and filter element according to this invention.

FIG. 4 shows a particular embodiment of the invention designed to disturb a radiation in laser wavelengths. In this case a generator 9 produces a light beam 10 to detect a solid object (not shown) by reflection. The generator 9 is associated with a receiver 14 destined to intercept the reflected signal. According to the invention, a screen 11 containing the doping substances forming light cascades 12 is placed between the generator 9 and the object to be detected. The screen 11 absorbs the radiation 10 and re-transmits a different wavelength radiation 13 that the receiver 14 can no longer detect.

Figure 5:
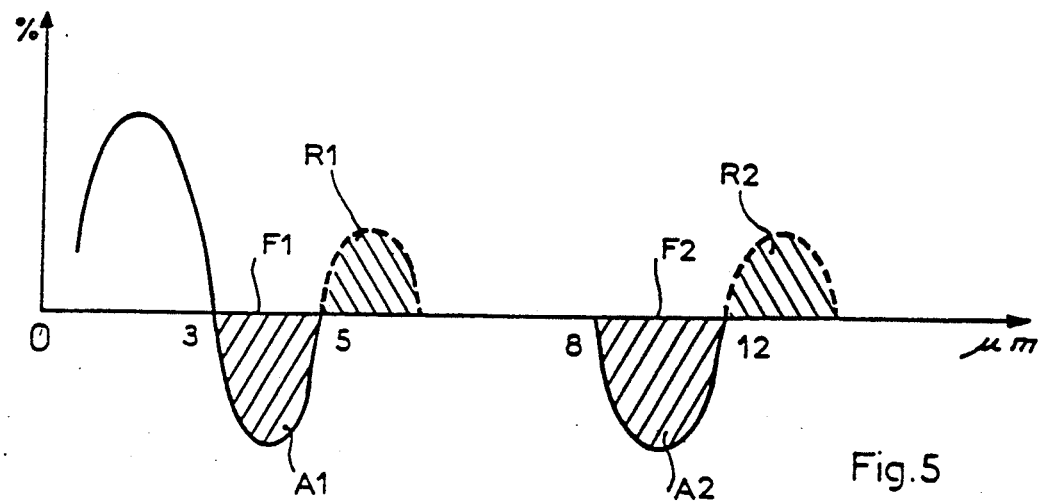
FIGS. 5 and 6 show the absorption and emission effects expressed pressed in percent of radiation energy as a function of the wavelengths of light cascades utilized according to alternative versions of the invention and FIG. 7 is a section in partial front view of an agricultural greenhouse roofed with a screen according to the invention.
Figure 6:
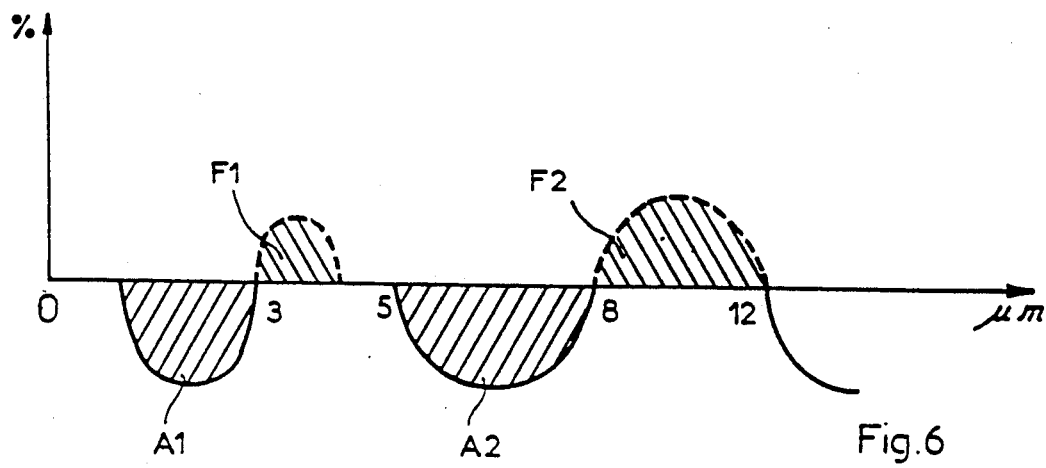

FIGS. 5 and 6 show the operation of two alternative versions of the invention. At F1 and F2 in the pictures, two wavelength bands are seen for radiations which are to be disturbed. According to the first alternative, screen light cascades 3, 11, absorb the radiation in F1 and F2 bands as shown at A1 and A2. Light cascades retransmit a radiation in a greater wavelength band outside the F1 and F2 bands as shown at R1 and R2.

The R1 or R2 radiation can no longer be detected by the detector 4, 14, which is designed to operate in the F1 and F2 bands.

According to the alternative shown in FIG. 6, the light cascades of the screen 3,11, absorb a radiation in wavelength bands smaller than the F1 and F2 bands. Then light cascades radiate in the F1 and F2 bands, which radiation is intercepted by the detector (4,14). This produces an efficient disturbance of reception and therefore in this way baits can be obtained, that are localizable only with difficulty.

The screens of the invention are made of foils, plates or coatings of plastic materials that proved to be of special interest for the wavelengths considered in this invention.

For a screen operating basically by the absorption of an infrared radiation, the process of the invention utilizes acryl-vinyl copolymers (FIG. 1)

For the screens which operated by reflection and absorption within a first wavelength band and re-radiation within a second wavelength band, one or more of the following materials are utilized according to the invention: polyethylene, polyethylene-PMMA copolymers, polyethylene-polystyrene copolymers and PMMA-EVA-polystyrene copolymers (FIGS. 3 and 4)

Screen 3 constituting foils and plates, FIGS. 3 and 4, according to the invention, comprise scintillating and/or luminescent substances added in homogeneous dispersion and forming light cascades. In order to achieve this light cascade effect, two and preferably four different doping materials are utilized.

As a rule, the doping materials are aromatic cyclic materials containing several nuclei and preferably 10 to 15 nuclei.

According to the invention, screens 3 contain at least two doping substances in the following groups: hydroxyl materials with ketone groups, amino groups with double carbonated linking, amino groups associated with quaternary amino and ketone groups, benezene-cyclane groups, linked phenyl-benzene group, double linking groups connecting aromatic cycles, and associated nitrile groups.

According to the invention, preferably at least one amino group associated with a ketone group is used.

According to another preferred embodiment, the doping materials used are a tri-fluoro-methacrylate, a di-benzatron, oxybenzanyle or a dioxi-benzatron. The last said material contains, for instance, 9 nuclei and 7 free linkings.

In such cases, the organic matrix comprises at least one of the following polymers or copolymers:
low-density polyethylene,
polyethylene-polybutyl-butyl-vinyl-acetate,
ethyl-vinyl-low density acetate,
polystyrene,
polyethylene-PMMA,
polyethylene-ethyl-vinyl-acetate,
PMMA-ethyl-vinyl-acetate,
polyethylene-acryl acid-modified acrylic,
polyureanidine,
polytetrafluorotene, and
polyfluorotene-PMMA.

Doping materials are preferably supplied by chemical grafting and may preferably be provided in a concentration of $10^{-3}$ to $10^{-8}$ moles/l.

The individual doping substances are associated to form light cascades the absorption and emission spectra of which meet the requirements of the disturbance effects aimed at by the invention as detailed in the foregoing. The structure and operation of such light cascades are described in a detailed manner in the applicant's French patent No 76 09321.

According to a preferred form of realization, the screen of the invention for the disturbance of the transmission of an infrared radiation is made of a composite film obtained by a coextrusion process and including a first outer layer operating by absorption of the radiation, an inner intermediary layer operating by radiation reflection and a second outer layer operating by absorption and re-radiation in another wavelength band. Such a screen gives the possibility to practically blind infrared cameras operating in wavelength bands comprised between 2 and 12 micrometers.

Figure 7:
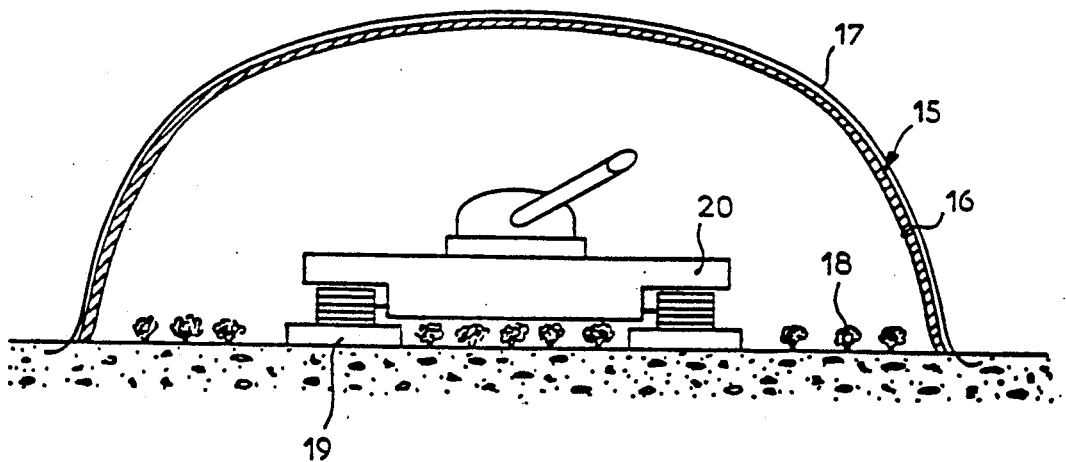

FIG. 7 shows an application of special interest of a form of embodiment of the screen of the invention. The figure shows an agricultural greenhouse 15 composed of a framework 16 supporting a flexible coating sheet 17 which is a screen according to the invention. In addition, the screen includes doping materials which form light cascades the absorption band of which covers definite wavelengths of solar radiation while the emission band solely covers vegetable photosynthesis. Such cascades are described in the French patent application No 81 16678 by the applicant. The foil 17 then promotes the growing of plants. If need be, a military vehicle 20 can be sheltered in the greenhouse 15 to afford a protection against detection by infrared cameras. With a view to such a use, a track 19 for vehicles 20 is arranged between plants.

According to a particular alternative, light cascades the re-radiation of which promotes plant photosynthesis are of the type that also absorbs 70% of the radiation by a wavelength ranging from 8 to 12 micrometers.

For other applications and more particularly for the disturbance of infrared autodirectors, light cascades have an absorption band comprised between 3 and 5 micrometers and a re-emission band comprised between 5 and 8 micrometers.

The invention of course is not restricted to the forms of embodiment described here. Modifications are possible without departing from the scope of the invention. For instance, the effects according to the invention may be associated with the effect of known absorbing and reflecting materials that do not comprise luminescent or scintillating doping materials.

I claim:

1. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said source is a heat generating source and said receiver and infrared detector.

2. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said screen absorbs infrared radiation within a wavelength band less than 2 micrometers and re-emits it within the wavelength band comprised between 2 and 12 micrometers.

3. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said source comprises a radiation generator (9) directing radiation toward an object and said receiver comprises a receiver (14) for detecting radiation reflected from said object, said generator and receiver being disposed on the same side of said screen and on the opposite side of said screen from said object.

4. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said screen is formed of an organic matrix comprising a series of luminescent or scintillating doping substances, wherein said doping substances constitute at least one light cascade, wherein the absorption band of the light cascade is comprised of wavelengths from 2 to 12 micrometers and wherein the emission band is located in wavelengths higher than 12 micrometers.

5. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said screen is formed of an organic matrix comprising a series of luminescent or scintillating doping substances, wherein said doping substances constitute at least one light cascade, wherein the absorption band of the light cascade is located in wavelengths smaller than 2 micrometers while the emission band is located in wavelengths comprised between 2 and 12 micrometers.

6. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said screen is formed of an organic matrix comprising a series of luminescent or scintillating doping substances, wherein said doping substances comprise at least two materials of the following chemical groups: hydroxyl materials with ketone groups, amino groups with double carbonated linking, amino groups associated with quaternary aminos, amino groups associated with quarternary aminos and ketone groups, amino groups associated with a ketone group, benzene-cyclane groups, linked phenyl-benzene groups, double linking groups connecting aromatic cycles, associated nitrile groups.

7. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said screen is formed of an organic matrix comprising a series of luminescent or scintillating doping substances, wherein the doping substances are inserted by chemical grafting.

8. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said screen is formed of an organic matrix comprising a series of luminescent or scintillating doping substances, wherein said organic matrix comprises at least one of the following polymers or copolymers: vinyl copolymers, polyethylene, polyethylene-PMMA copolymers, polyethylene-polystyrene copolymers, PMMA-EVA-polystyrene copolymers, low-density polyethylene, polyethylene-polybutyl-butyl-vinyl-acetate, low-density ethyl-vinyl-acetate, polystyrene, PPMA-polyethylene, polyethylene-ethyl-vinyl-acetate, PMMA-ethyl-vinyl-acetate, acetate, polyethylene-acryl acid-modified acrylic, polyureanidine, polytetrafluorotene, polyfluorotene-PMMA.

9. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said screen is formed of an organic matrix comprising a series of luminescent or scintillating doping substances, and wherein said screen comprising an absorption layer, a reflection layer and an absorption/re-emission layer.

10. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said screen is formed of an organic matrix comprising a series of luminescent or scintillating doping substances, wherein said screen also comprises doping substances forming light cascades the absorption band of which substantially covers the solar radiation spectrum while the emission band of said light cascade solely covers the wavelength bands promoting plant photosynthesis.

11. The screen of claim 10, wherein the light cascades absorbs radiation of a wavelength between 8 and 12 micrometers.

12. The screen of claim 11, designed to disturb infrared autodirectors, wherein the light cascades have an absorption band ranging from 3 to 5 micrometers and a re-emission band ranging from 5 to 8 micrometers.

13. An apparatus for disturbing the transmission of radiation of a predetermined wavelength from a source of said radiation to a receiver sensitive to a frequency band including said predetermined frequency, said apparatus comprising a screen disposed between said source and receiver for absorbing at least a portion of said radiation and re-emitting radiation in a wavelength outside of said frequency band, wherein said screen is formed of an organic matrix comprising a series of luminescent or scintillating doping substances, wherein the doping substances also comprise at least one of the following substances: tri-chloro-methacrylate, di-benzatron-oxybenzanyle and di-oxybenzatron.

* * * * *